Patented Oct. 14, 1952

2,614,112

UNITED STATES PATENT OFFICE 2,614,112

POLYMERIC TITANIUM MIXED ESTERS

Thomas Boyd, Springfield, Mass., assignor to Monsanto Chemical Company, St. Louis, Mo., a corporation of Delaware No Drawing. Application January 30, 1951, Serial No. 208,667

13 Claims. (Cl. 260—429)

This invention relates to a novel group of organic derivatives of titanium and to methods for their preparation. More particularly, the invention relates to polymeric esters of orthotitanic acid in which the ester groups are derived from a plurality of alcohols.

Polymeric esters of orthotitanic acid are disclosed and claimed in co-pending application Serial No. 122,844, filed October 21, 1949. They may be prepared by reaction of the monomeric esters of orthotitanic acid with up to one mol of water per mol of ester under otherwise anhydrous conditions. As disclosed in the cited application, copolymers of two different esters of orthotitanic acid may be prepared by this method.

One object of this invention is to provide polymeric esters of orthotitanic acid in which the ester groups are derived from a plurality of alcohols or phenols.

A further object of this invention is to provide a process for preparing polymeric esters of orthotitanic acid in which the ester groups are derived from a plurality of alcohols or phenols.

These and other objects are attained by reacting a straight chain polymeric ester of orthotitanic acid with one or more alcohols or phenols under substantially anhydrous conditions and in the absence of a catalyst. The reaction may be carried out en masse or in a solvent medium.

The following examples are given in illustration and are not intended as limitations on the scope of this invention. Where parts are mentioned, they are parts by weight.

Example I

A polymer of tetrabutyl orthotitanate was prepared by reacting one mol of the monomer with 0.5 mol of water under otherwise anhydrous conditions. Forty parts of the polymer were mixed with 100 parts of stearyl alcohol and the mixture was heated gently until it became liquid. The temperature of the reaction mixture was then raised gradually to about 210° C. accompanied by a gradual reduction in pressure to about 1 mm. of mercury absolute. The temperature was maintained at 210° C. at 1 mm. mercury pressure for about 10 minutes. During this time, about 26 parts of butanol distilled off, leaving a light yellow waxy solid polymeric ester of orthotitanic acid containing about two butyl groups and about four stearyl groups per molecule.

Example II

A polymer of tetra(2-ethyl hexyl) orthotitanate was prepared by reacting one mol of the monomer with 0.5 mol of water under otherwise anhydrous conditions. Sixty-seven parts of the polymer were mixed with 100 parts of stearyl alcohol and the mixture was heated gently until a liquid mixture resulted. The temperature of the reaction mixture was then raised to about 250° C. and the pressure was reduced to about 0.5 mm. of mercury absolute. The temperature increase and the pressure decrease were accomplished gradually. The reaction was continued at 250° C. and 0.5 mm. pressure for about 30 minutes during which 30 parts of 2-ethyl hexanol were recovered. The product was a waxy, low-melting solid polymeric ester of orthotitanic acid containing about two 2-ethyl hexyl groups and about four stearyl groups.

Example III

One mol of a pentamer of tetrabutyl orthotitanate was dissolved in anhydrous butanol and two mols of phenol were added to the solution. The solution was heated at reflux temperature and atmospheric pressure for about 15 minutes after which four mols of lauryl alcohol were added to the reaction mixture. Heating at reflux temperature and at atmospheric pressure was continued for about 15 minutes and then the solvent was removed by distillation under reduced pressure. The product was a straw-colored waxy solid polymeric ester of orthotitanic acid containing about two phenyl groups, four lauryl groups and six butyl groups per molecule. It was soluble in aromatic hydrocarbons.

The polymeric mixed esters of this invention are soluble in mineral spirits and aromatic hydrocarbons. They range from viscous liquids to wax-like solids of relatively low melting point. They may be used to render paper and textile fibers and fabrics water-repellent and as modifiers for various natural and synthetic resins, particularly in coating compositions.

The process of this invention may be carried out in the absence of solvents in which case the starting polymer and alcohol or phenol are heated together until a liquid reaction medium is obtained. The temperature of the reaction is then raised slowly, accompanied by a gradual decrease in pressure. Finally, the alcohol removed from the original polymer by the reaction with the new alcohol, is distilled off leaving the mixed ester polymer in the reaction vessel.

If desired, the reaction may be carried out in an organic solvent such as an alcohol, carbon tetrachloride, chloroform, ethyl ether, diphenyl ether, toluene, benzene, xylene, petroleum naphtha, gasoline, kerosene, etc. It is especially important that all of the materials be anhydrous. When a solvent is used, the reaction is carried out for from 10 to 30 minutes at reflux temperature and atmospheric pressure and then the solvent and alcohol released by the reaction are distilled off at temperatures up to 300° C. at reduced pressures. A particularly desirable solvent system is one in which the solvent is the alcohol from which the ester groups on the original polymer were derived.

Whether the reaction is carried out en masse or in an organic solvent, the final step of removing the alcohol released during the reaction is carried out at temperatures ranging from 100° C. to 300° C. at sub-atmospheric pressures in the range of 0.1 mm. to 10 mm. of mercury absolute. This step may be completed in five minutes with some of the alcohols and it may take as long as eight hours with others.

The polymeric esters of orthotitanic acid which are used as starting materials are straight chain polymers which are produced by reacting the monomeric esters with up to one mol of water per mol of ester under otherwise anhydrous conditions. The polymeric esters and the method of producing them are disclosed and claimed in copending application Serial No. 122,844, filed October 21, 1949. The degree of polymerization of the esters is governed by the amount of water used and approaches infinity asymptotically as the amount of water approaches one mol per mol of ester monomer. Polymers made with more than one mol of water are severely crosslinked and are not operative in this invention. For ease of operation, the polymeric starting material should be a polymer of an ester in which the ester group contains no more than eight carbon atoms. Polymers of the following tetraesters of orthotitanic acid may be used; the methyl, ethyl, propyl, isopropyl, n-butyl, isobutyl, secondary butyl, tertiary butyl, phenyl and the various isomeric amyl, hexyl, heptyl, octyl, toluyl, xylenyl, and phenethyl esters.

It is possible to use any alcohol or phenol as the second reactant in the process of this invention. However, it is preferred to use alcohols or phenols having more than eight carbon atoms in the molecule since the products produced thereby have particularly good properties as water-repellent agents, surface coating components, resin cure accelerators, sizing agents for mineral and organic fibers such as glass and cellulosic fibers, etc. Thus, the more important mixed ester polymers contain at least one ester group containing eight or less carbon atoms and the remainder of the groups contain more than eight carbon atoms. Among the alcohols and phenols which may be used are the nonyl, decyl, dodecyl, lauryl, myristyl, palmityl, stearyl, cetyl, oleyl, linoleyl, etc. alcohols and naphthols, acenaphthols, chlorophenols, nitrophenols, etc.

For certain uses, it may be desirable to obtain a polymer having more than two different ester groups. This may be accomplished by reacting the polymeric ester with each of two or more alcohols or alcohols and phenols. The reaction may be carried out stepwise with each of the alcohol or phenol reactants being added separately or two or more alcohols and phenols may be mixed and reacted simultaneously with the polymeric ester.

The process of this invention makes it possible to prepare polymeric mixed esters of orthotitanic acid in the absence of catalyst. The mixed ester products are particularly valuable as textile and paper treating agents and as modifiers and curing agents for various natural and synthetic resins.

It is obvious that variations may be made in the process and products of this invention without departing from the spirit and scope thereof as defined in the appended claims.

What is claimed is:

1. A process for preparing straight chain polymeric mixed esters of orthotitanic acid which comprises reacting a straight chain polymer of an ester of orthotitanic acid in which the ester groups are derived from a compound from the group consisting of lower aliphatic alcohols and phenols containing from one to eight carbon atoms, with a compound from the group consisting of higher aliphatic alcohols and phenols containing more than eight carbon atoms, said reaction being carried out under anhydrous conditions and in the absence of catalysts, and thereafter distilling off the by-product alcohol produced by the reaction, at temperatures from 100° C. to 300° C. and pressures from 0.1 mm. to 10 mm. of mercury absolute.

2. A process as in claim 1 wherein the lower alcohol is butanol.

3. A process as in claim 1 wherein the lower alcohol is 2-ethyl hexanol.

4. A process as in claim 1 wherein the higher alcohol is stearyl alcohol.

5. A process as in claim 1 wherein the higher alcohol is lauryl alcohol.

6. A process as in claim 1 wherein the lower alcohol is butanol and the higher alcohol is stearyl alcohol.

7. A straight-chain polymeric mixed ester of orthotitanic acid corresponding to the general formula:

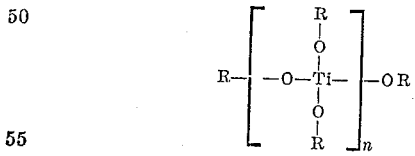

wherein R represents ester groups derived from compounds of the group consisting of aliphatic alcohols and phenols, at least one of said ester groups being derived from a compound taken from the group consisting of lower aliphatic alcohols and phenols containing from one to eight carbon atoms, at least one other of said ester groups being derived from a compound taken from the group consisting of higher aliphatic alcohols and phenols containing more than eight carbon atoms, and wherein $n$ is a whole number greater than one.

8. A straight-chain polymeric mixed ester of orthotitanic acid as in claim 7 wherein the lower aliphatic alcohol is butanol.

9. A straight-chain polymeric mixed ester of orthotitanic acid as in claim 7 wherein the lower aliphatic alcohol is 2-ethyl hexanol.

10. A straight-chain polymeric mixed ester of orthotitanic acid as in claim 7 wherein the higher aliphatic alcohol is stearyl alcohol.

11. A straight-chain polymeric mixed ester of orthotitanic acid as in claim 7 wherein the higher aliphatic alcohol is lauryl alcohol.

12. A straight-chain polymeric mixed ester of orthotitanic acid as in claim 7 wherein the lower aliphatic alcohol is butanol and the higher aliphatic alcohol is stearyl alcohol.

13. A straight-chain polymeric mixed ester of orthotitanic acid as in claim 7 wherein the ester groups are derived from butanol, phenol and lauryl alcohol.

THOMAS BOYD.

REFERENCES CITED

The following references are of record in the file of this patent:

UNITED STATES PATENTS

| Number | Name | Date |
| --- | --- | --- |
| 2,489,651 | Langkammerer | Nov. 29, 1949 |

FOREIGN PATENTS

| Number | Country | Date |
| --- | --- | --- |
| 124,450 | Australia | Sept. 25, 1947 |